(12) United States Patent
Asao

(10) Patent No.: US 6,291,921 B1
(45) Date of Patent: Sep. 18, 2001

(54) AUTOMOTIVE ALTERNATOR

(75) Inventor: Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/557,615

(22) Filed: Apr. 25, 2000

(30) Foreign Application Priority Data

Dec. 14, 1999 (JP) .................................................. 11-354454

(51) Int. Cl.$^7$ ....................................................... H02K 1/22
(52) U.S. Cl. ................................................ 310/263; 310/42
(58) Field of Search ........................... 310/42, 216–218, 310/254–258, 261–263; 29/596–598

(56) References Cited

U.S. PATENT DOCUMENTS

| | | | |
|---|---|---|---|
| 3,714,484 | * 1/1973 | Habert | 310/263 |
| 4,201,930 | * 5/1980 | Inagaki et al. | 310/263 |
| 4,972,114 | * 11/1990 | Frister | 310/263 |
| 5,270,605 | * 12/1993 | Lefrancois et al. | 310/263 |
| 5,708,318 | * 1/1998 | Fudono | 310/263 |

FOREIGN PATENT DOCUMENTS 7-26345    1/1992   (JP) .

* cited by examiner

*Primary Examiner*—Tran Nguyen
(74) *Attorney, Agent, or Firm*—Sughrue, Mion, Zinn, Macpeak & Seas, PLLC

(57) ABSTRACT

A flat surface portion extending substantially parallel to a shaft is formed in a root portion of a claw-shaped magnetic pole such that between adjacent claw-shaped magnetic poles, the end portion of the tooth and the two claw-shaped magnetic poles do not overlap simultaneously in the radial direction.

11 Claims, 13 Drawing Sheets

δ: THE DISTANCE OF THE CLEARANCE BETWEEN THE END PORTION OF THE TOOTH AND THE CLAW-SHAPED MAGNETIC POLES

β: THE DISTANCE BETWEEN THE INNER CIRCUMFERENTIAL SURFACE OF THE END PORTION AND THE OUTER CIRCUMFERENTIAL PORTION OF THE CLAW-SHAPED MAGNETIC POLES

δ: THE DISTANCE OF THE CLEARANCE BETWEEN THE END PORTION OF THE TOOTH AND THE CLAW-SHAPED MAGNETIC POLES

β: THE DISTANCE BETWEEN THE INNER CIRCUMFERENTIAL SURFACE OF THE END PORTION AND THE OUTER CIRCUMFERENTIAL PORTION OF THE CLAW-SHAPED MAGNETIC POLES

AUTOMOTIVE ALTERNATOR

BACKGROUND OF THE INVENTION

1. Field of the Invention

The present invention relates to an automotive alternator in which a voltage is generated in a stator by rotation of a rotor.

2. Description of the Related Art

FIG. 9 is a cross-section of a conventional automotive alternator, and FIG. 10 is a perspective view of the rotor in FIG. 9.

This automotive alternator includes: a case 3 composed of an aluminum front bracket 1 and an aluminum rear bracket 2; a shaft 6 disposed in the case 3, a pulley 4 being secured to a first end of the shaft 6; a Lundell-type rotor 7 secured to the shaft 6; fans 5 secured to both ends of the rotor 7; a stator 8 secured to an inner wall of the case 3; slip rings 9 secured to a second end of the shaft 6 for supplying electric current to the rotor 7; a pair of brushes 10 moving in contact with the surface of the slip rings 9; a brush holder 11 accommodating the brushes 10; a rectifier 12 in electrical contact with the stator 8 for converting alternating current generated in the stator 8 into direct current; and a regulator 18 fitted over the brush holder 11 for adjusting the magnitude of the alternating current generated in the stator 8.

The rotor 7 includes: a field coil 13 generating magnetic flux on passage of electric current; and a pole core 14 disposed so as to cover the field coil 13 in which magnetic poles are produced by the magnetic flux generated by the field coil 13. The pole core 14 includes a first pole core body 21 and a second pole core body 22 which are mutually interlocked. The first pole core body 21 and the second pole core body 22 are made of iron, and have tapered claw-shaped magnetic poles 23 and 24, respectively.

FIG. 11 is a perspective of the stator 8 in FIG. 9, FIG. 12 is a perspective of the stator core 15 in FIG. 9, and FIG. 13 is a partial plan of the stator core 15.

The stator 8 includes: a stator core 15 laminated from a number of steel plates through which a rotating magnetic field from the field coil 13 passes; and a three-phase stator coil 16 through which generated electric current flows. The stator core 15 includes: an annular core back 82; and a number of teeth 81 spaced evenly in the circumferential direction and extending radially inwards from the core back 82. The three-phase stator coil 16 is housed in slots 83 between adjacent teeth 81. The teeth 81 include: broad end portions 85 extending in a circumferential direction of the stator 8; and column portions 86 connecting the end portions 85 to the core backs 82. Spaces called openings 84 are formed between the end portions 85 of adjacent teeth 81.

FIG. 14 is a circuit diagram for a conventional automotive alternator of the above construction, the stator coil 16 being composed of three windings Y in a three-phase Y-connection. The rectifier 12 includes diodes 123 and 125.

In an automotive alternator of the above construction, a current is supplied by a battery (not shown) through the brushes 10 and slip rings 9 to the field coil 13, whereby a magnetic flux is generated, giving rise to a magnetic field. At the same time, the pulley 4 is driven by an engine and the rotor 7 is rotated by the shaft 6 such the stator core 15 is subjected to a rotating magnetic field, electromotive force is generated in the stator coil 16, and output current is generated by an external load connected to the automotive alternator. The alternating current generated by the stator 8 is converted into a direct current by the rectifier 12. Moreover, the current flowing through the field coil 13 is controlled by the regulator 18 to adjust the magnitude of the voltage of the alternating current generated by the stator 8.

In an automotive alternator of the above construction, there are twelve poles in the rotor 7, and thirty-six slots 83 in the stator core 15, making one slot 83 per pole per phase, and one problem has been when the dimensions of the openings 84 are reduced in order to reduce the magnetic resistance of an air gap between the stator 8 and the rotor 7, claw-shaped magnetic poles 23 and 24 overlap the end portions 85 of the same tooth 81 simultaneously when viewed from a radial direction, increasing the amount of ineffective magnetic flux flowing in the end portions 85 as indicated by arrow B and reducing the amount of magnetic flux generated by the field coil 13 being routed through the stator coil 16, thereby reducing output.

SUMMARY OF THE INVENTION

The present invention aims to solve the above problems and an object of the present invention is to provide an automotive alternator enabling output to be improved by enabling the amount of ineffective magnetic flux flowing through a tooth between adjacent claw-shaped magnetic poles to be reduced and increasing effective magnetic flux.

To this end, according to the present invention, there is provided an automotive alternator comprising a rotor having a flat surface portion extending substantially parallel to a shaft secured to the pole core, the flat surface portion being formed in a root portion of claw-shaped magnetic pole such that when an end portion of a tooth spread in a circumferential direction is positioned between adjacent claw-shaped magnetic poles, there is clearance between the end portion of the tooth and at least one of the claw-shaped magnetic poles when viewed from a radial direction.

According to another aspect of the present invention, there is provided an automotive alternator comprising a rotor having stepped portions extending longitudinally being formed on two side surfaces of the claw-shaped magnetic pole such that when an end portion of a tooth spread in a circumferential direction is positioned between adjacent claw-shaped magnetic poles, there is clearance between the end portion of the tooth and at least one of the stepped portions of the adjacent claw-shaped magnetic poles when viewed from a radial direction.

DETAILED DESCRIPTION OF THE PREFERRED EMBODIMENTS

Embodiment 1

An automotive alternator according to Embodiment 1 of the present invention will be explained below. Parts the same as or corresponding to compositional elements indicated in the conventional example will be explained using the same numbering.

Figure 1:
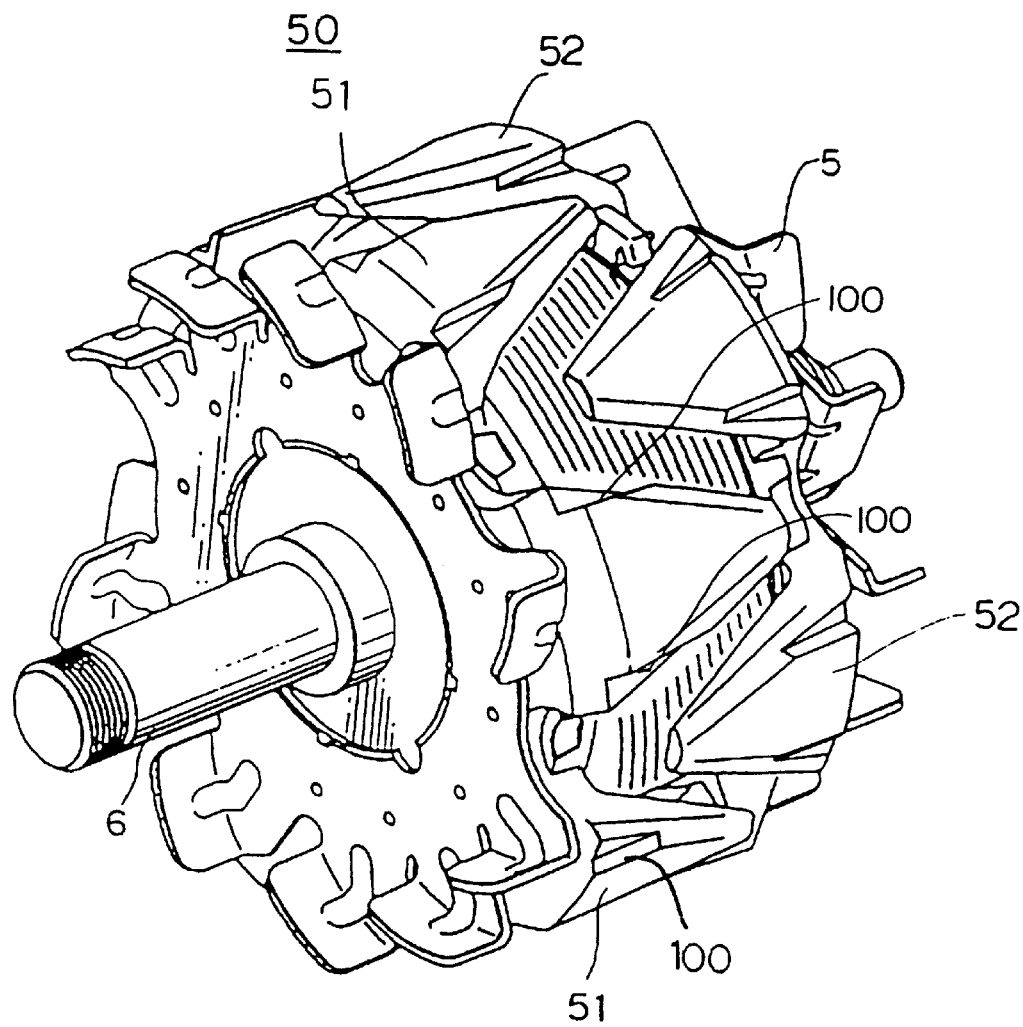
FIG. 1 is a perspective of a rotor of an automotive alternator according to Embodiment 1 of the present invention.
Figure 2:
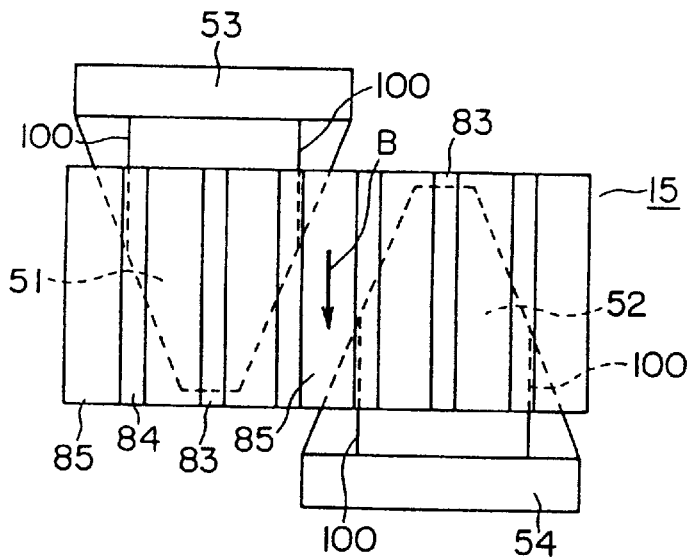
FIG. 2 is a diagram explaining the positional relationship between an inner radial surface of a stator core and an outer radial surface of the rotor of the automotive alternator according to Embodiment 1 of the present invention.
Figure 3:
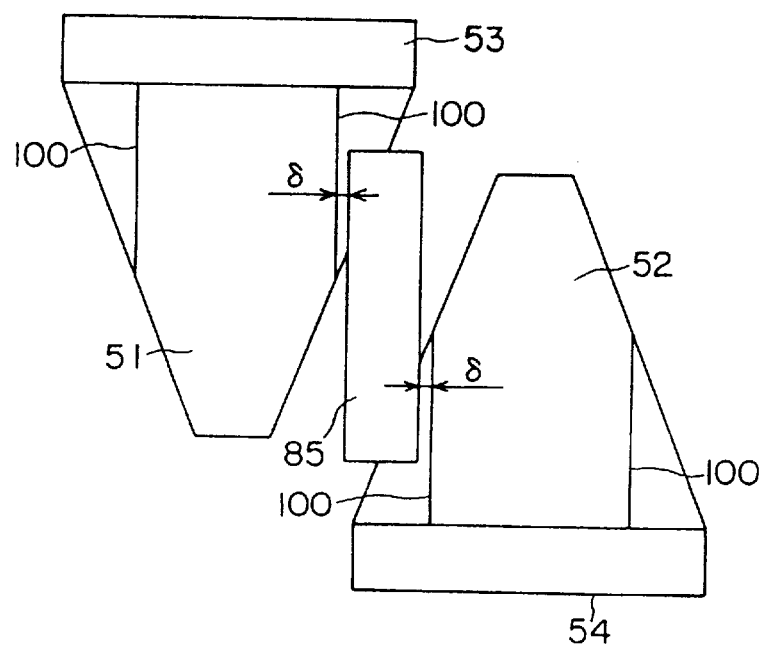
FIG. 3 is a partial enlargement of FIG. 2.

FIG. 1 is a perspective of a rotor 50 of an automotive alternator according to Embodiment 1 of the present invention, FIG. 2 is a diagram explaining the positional relationship between an inner radial surface of a stator core 15 and an outer radial surface of the rotor 50 of the automotive alternator according to Embodiment 1 of the present invention, and FIG. 3 is a partial enlargement of FIG. 2.

The rotor 50 of this embodiment includes: a field coil 13 for generating magnetic flux on passage of electric current; and a pole core disposed so as to cover the field coil 13 in which magnetic poles are produced by the magnetic flux generated by the field coil 13. The pole core includes a first pole core body 53 and a second pole core body 54 which are mutually interlocked. The first pole core body 53 and the second pole core body 54 are made of iron, and have tapered claw-shaped magnetic poles 51 and 52, respectively.

Figure 3A:
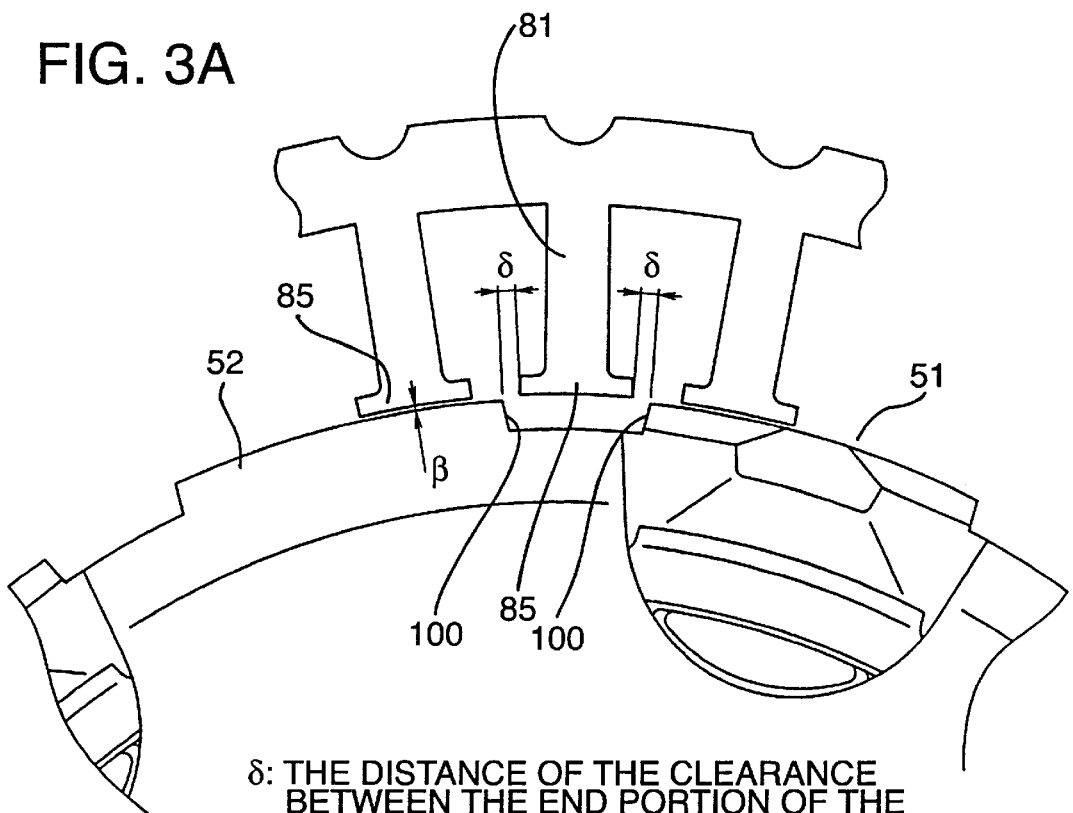
FIG. 3A is a diagram explaining the positional relationship between an edge of a stator tooth and a magnetic pole.
Figure 4:
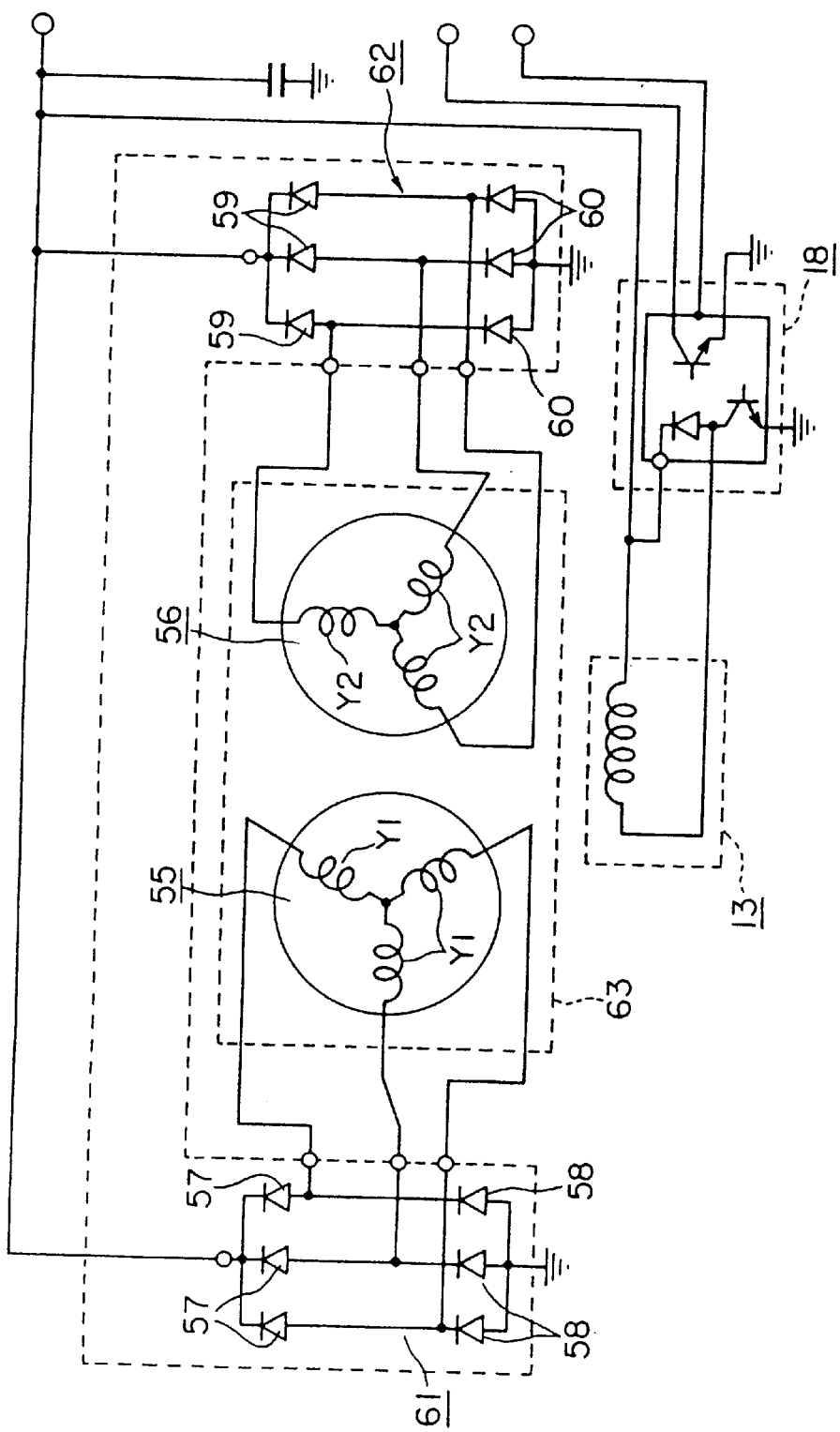
FIG. 4 is a circuit diagram for the automotive alternator in FIG. 1.

The claw-shaped magnetic poles 51 and 52 have a total of twelve poles, and a flat surface portion 100 extending substantially parallel to the shaft 6 is formed on a root portion of the claw-shaped magnetic poles 51 and 52 such that adjacent claw-shaped magnetic poles 51, 52 do not overlap the end portion 85 of the same tooth 81 simultaneously, as shown in FIGS. 2 and 3. Thus, when a center line between two adjacent claw-shaped magnetic poles 51, 52 is above a longitudinal center line of an end portion 85 of tooth 81, a clearance distance δ between the claw-shaped magnetic pole 51 and the end portion 85 and between the claw-shaped magnetic pole 52 and the end portion 85 is greater than the distance β (shown in FIG. 3A) between an inner circumferential surface of the end portion 85 and an outer circumferential portion of the claw-shaped magnetic pole 51 and between the inner circumferential surface of the end portion 85 and an outer circumferential portion of the claw-shaped magnetic pole 52.

Because the flat surface portion 100 extending substantially parallel to the shaft 6 is formed on a root portion of the claw-shaped magnetic poles 51 and 52, which have a total of twelve poles, such that the claw-shaped magnetic poles 51, 52 do not overlap the end portion 85 of the same tooth 81 simultaneously, the amount of ineffective magnetic flux flowing through the tooth between the adjacent claw-shaped magnetic poles 51 and 52 is reduced and effective magnetic flux is increased, thereby increasing output.

Figure 5:
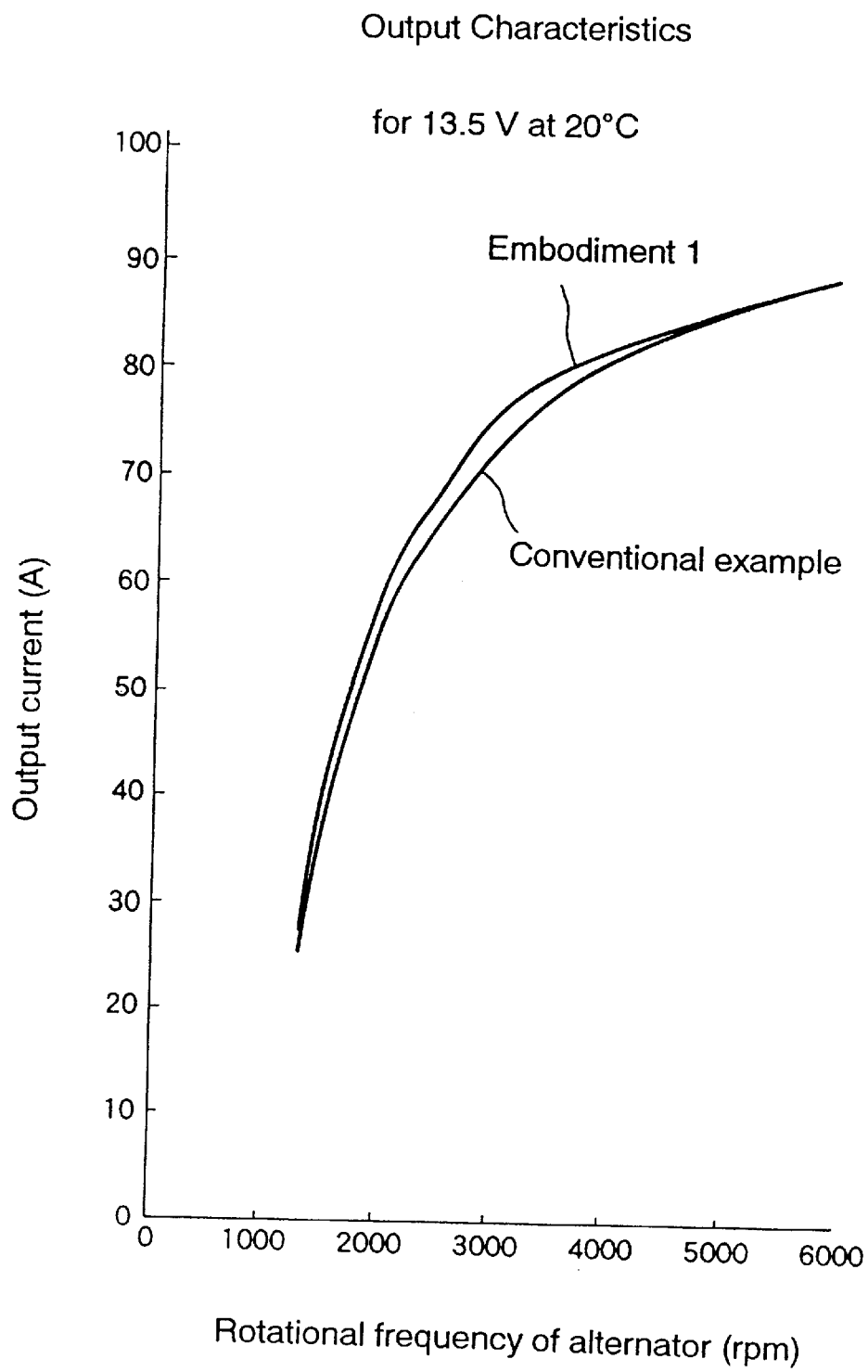
FIG. 5 is a graph of output characteristics of Embodiment 1 and a conventional example obtained experimentally by the present inventors.

FIG. 5 is a graph of output characteristics of Embodiment 1 and a conventional example obtained experimentally by the present inventors, from which it can also be seen that the output of Embodiment 1 is increased.

Embodiment 2

Figure 6:
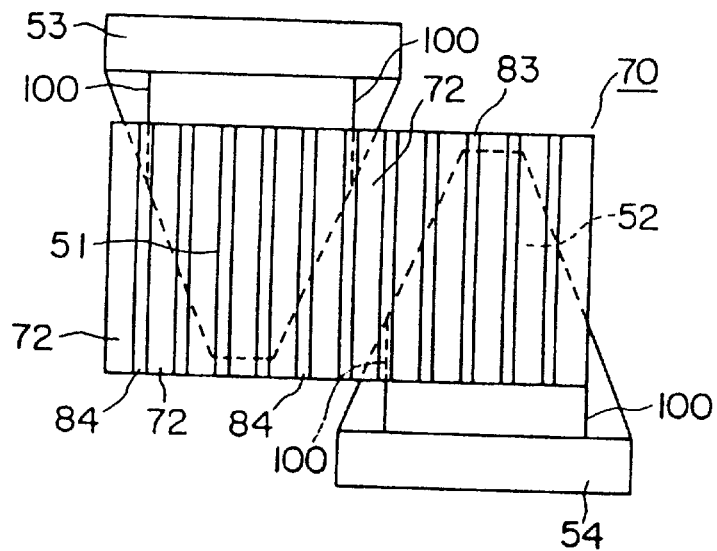
FIG. 6 is a diagram explaining the positional relationship between an inner radial surface of a stator core and an outer radial surface of a rotor of an automotive alternator according to Embodiment 2 of the present invention.

FIG. 6 is a diagram explaining the positional relationship between an inner radial surface of a stator core 70 and an outer radial surface of a rotor 50 of an automotive alternator according to Embodiment 2 of the present invention.

Whereas in Embodiment 1 there was one slot 83 per pole per phase, in Embodiment 2 there are twelve poles, seventy-two slots 83 in the stator core 70, and the stator coils are three-phase Y-connections, making two slots 83 per pole per phase. The rest of the construction is the same as for Embodiment 1.

In this embodiment, the circumferential width of end portions 72 of the teeth is proportionately narrower than in Embodiment 1 due to the increase in the number of slots 83, and when a center line between a claw-shaped magnetic pole 51 and an adjacent claw-shaped magnetic pole 52 is positioned above a longitudinal center line of an end portion 72, the clearance distance δ between the claw-shaped magnetic pole 51 and the end portion 72 and between the claw-shaped magnetic pole 52 and the end portion 72 is increased, and the cross-sectional area of magnetic passage through the end portions 72 is also reduced, increasing the magnetic resistance of the end portions 72 themselves, reducing the amount of ineffective magnetic flux flowing through the tooth between the adjacent claw-shaped magnetic poles 51 and 52 proportionately, and improving output further.

Embodiment 3

Figure 7:
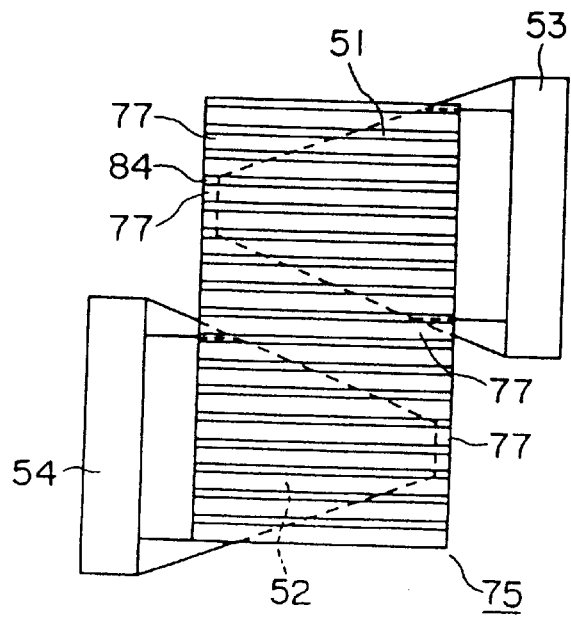
FIG. 7 is a diagram explaining the positional relationship between an inner radial surface of a stator core and an outer radial surface of a rotor of an automotive alternator according to Embodiment 3 of the present invention.

FIG. 7 is a diagram explaining the positional relationship between an inner radial surface of a stator core 75 and an outer radial surface of a rotor 50 of an automotive alternator according to Embodiment 3 of the present invention. In Embodiment 3 there are twelve poles, one hundred and eight (108) slots 83 in the stator core 75, and the stator coils are three-phase Y-connections, making three slots 83 per pole per phase. The rest of the construction is the same as for Embodiment 1.

In this embodiment, the circumferential width of end portions 77 of teeth 76 is proportionately narrower than in Embodiments 1 and 2 due to the increase in the number of slots 83, and when a center line between a claw-shaped magnetic pole 51 and an adjacent claw-shaped magnetic pole 52 is positioned above a longitudinal center line of an end portion 77, the clearance distance δ between the claw-shaped magnetic pole 51 and the end portion 77 and between the claw-shaped magnetic pole 52 and the end portion 77 is increased, and the cross-sectional area of magnetic passage through the end portions 77 is also reduced, increasing the magnetic resistance of the end portions 77 themselves, reducing the amount of ineffective magnetic flux flowing through the tooth 76 between the adjacent claw-shaped magnetic poles 51 and 52 proportionately, and improving output further.

Embodiment 4

Figure 8:
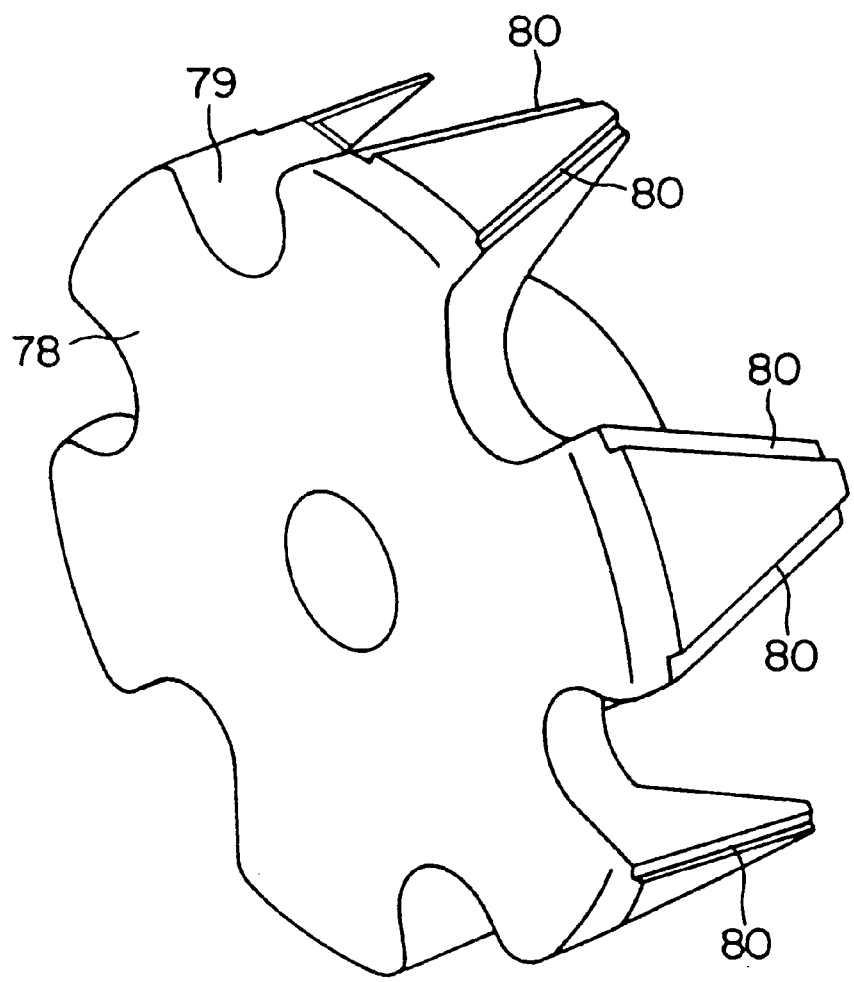
FIG. 8 is a perspective of a pole core body of an automotive alternator according to Embodiment 4 of the present invention.
Figure 9:
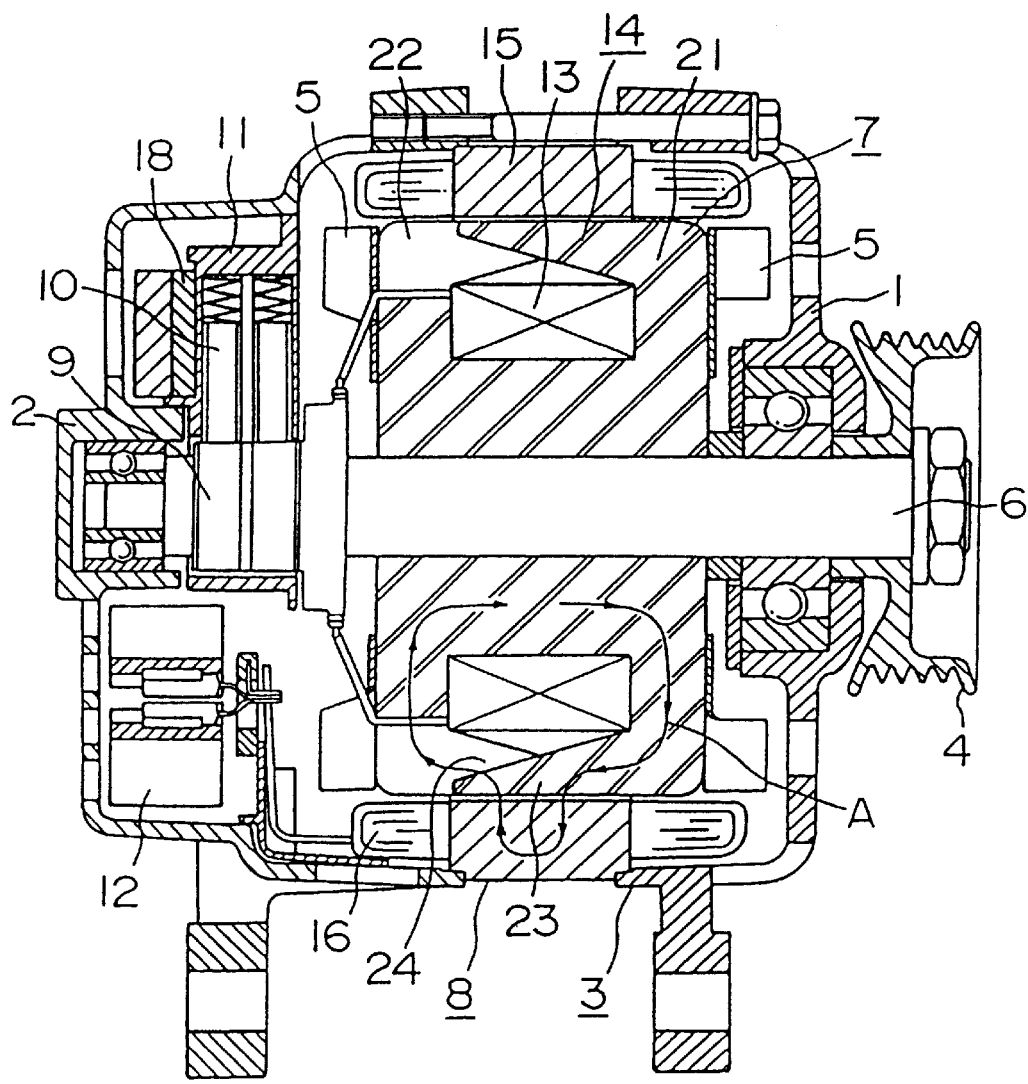
FIG. 9 is a cross-section of a conventional automotive alternator.
Figure 10:
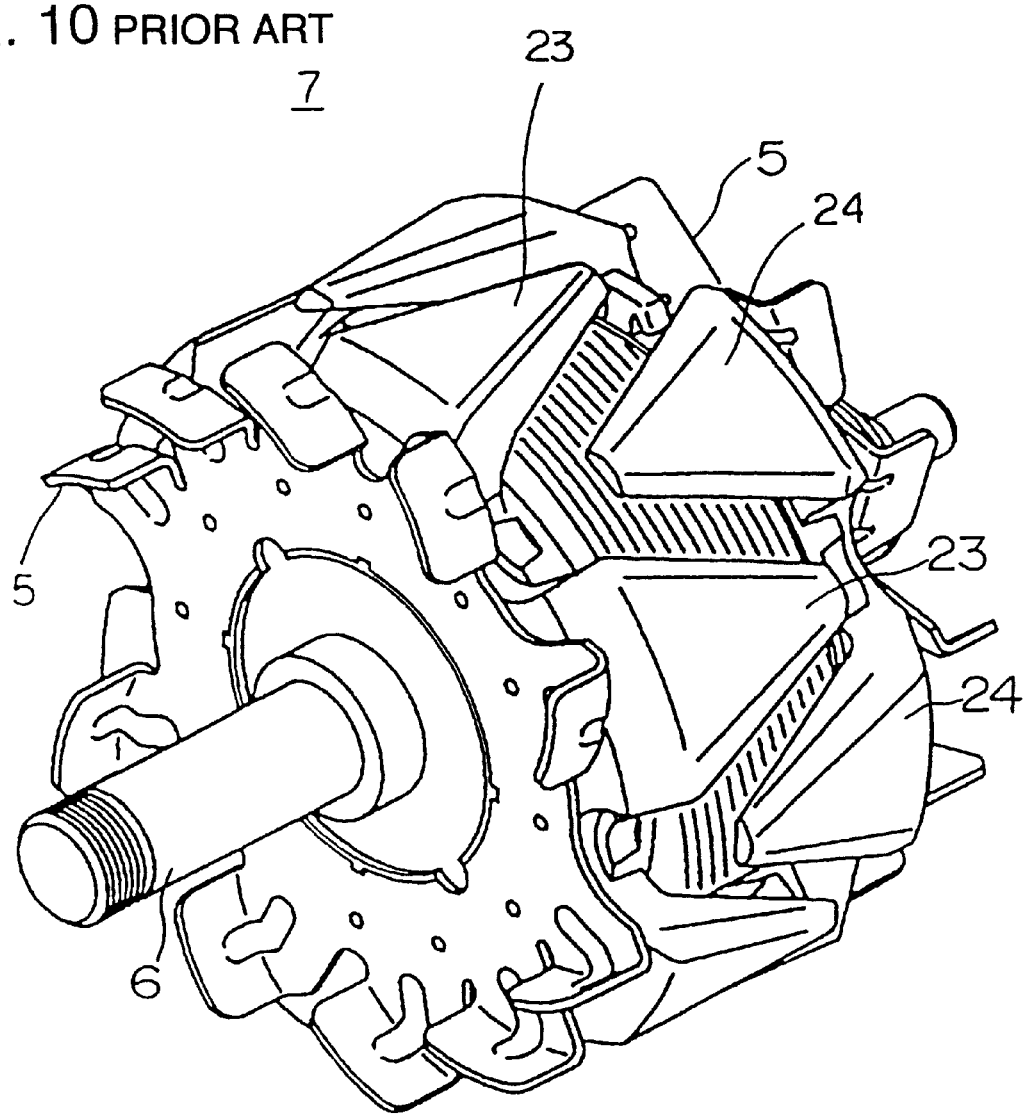
FIG. 10 is a perspective view of the rotor in FIG. 9.
Figure 11:
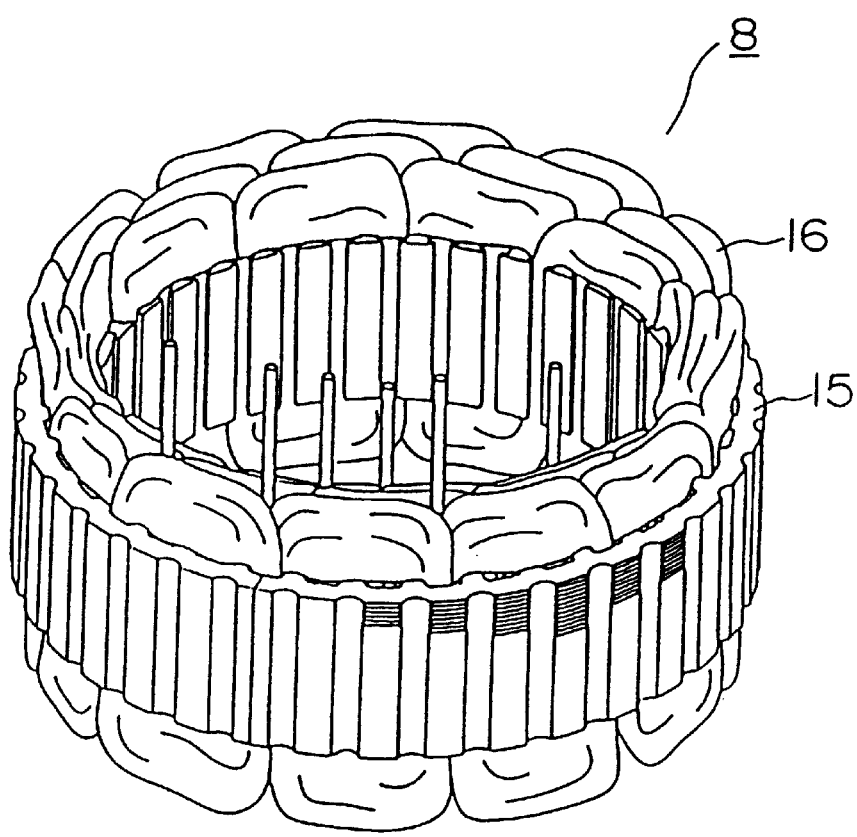
FIG. 11 is a perspective of the stator in FIG. 9.
Figure 12:
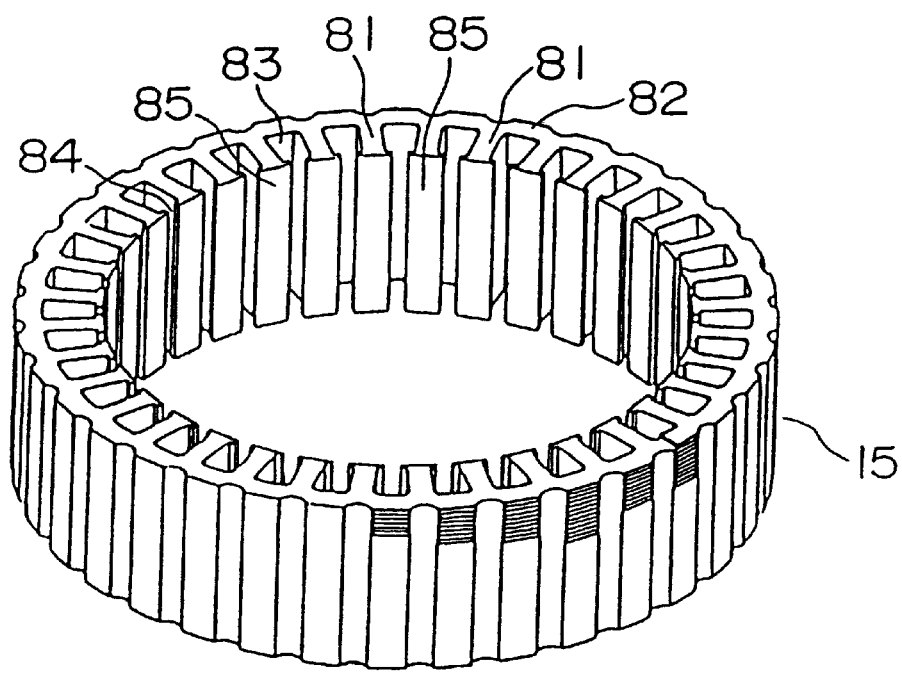
FIG. 12 is a perspective of the stator core in FIG. 9.
Figure 13:
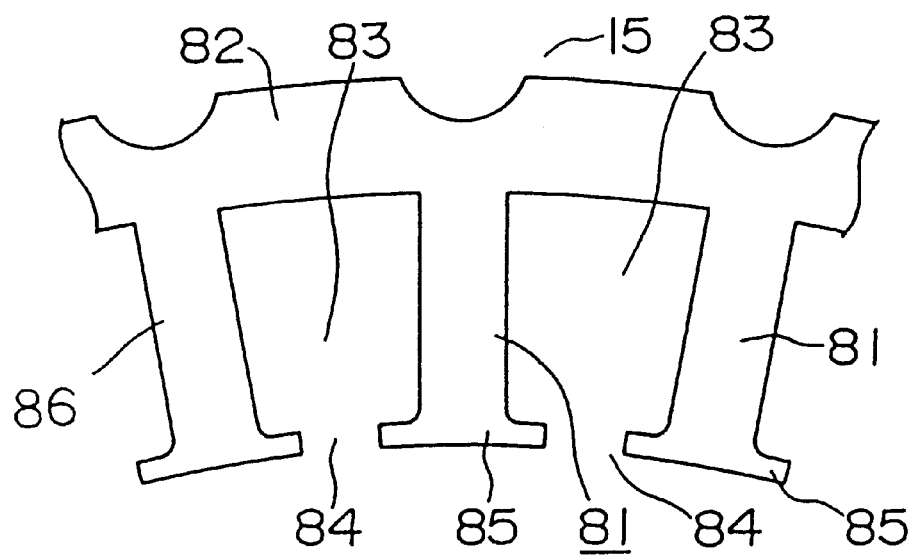
FIG. 13 is a partial plan of the stator core in FIG. 9.
Figure 14:
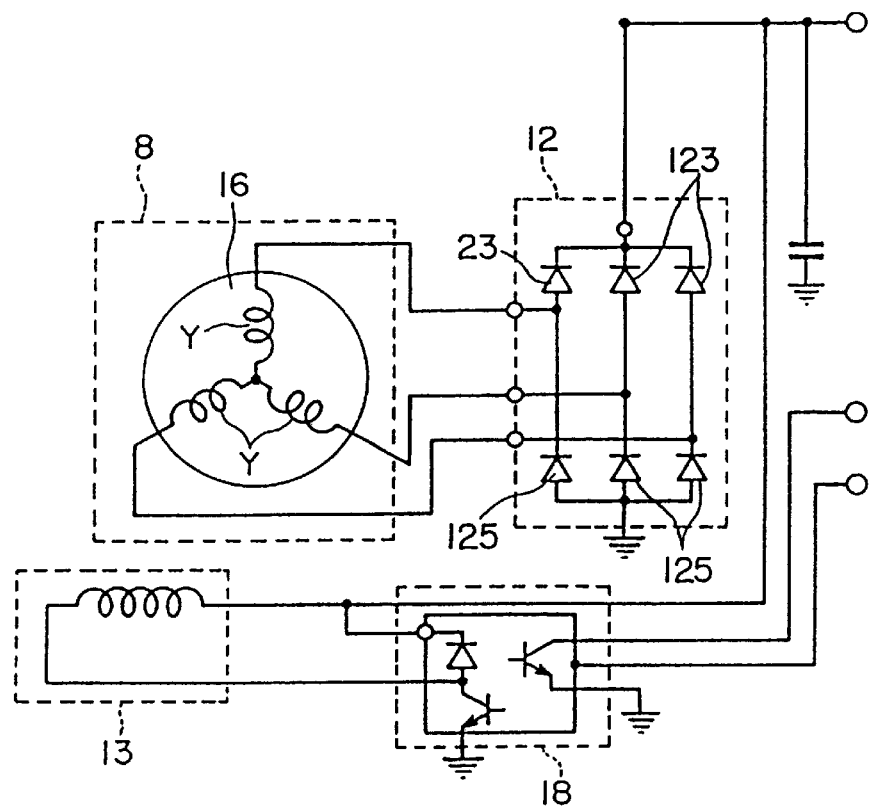
FIG. 14 is a circuit diagram for the automotive alternator in FIG. 9.
Figure 15:
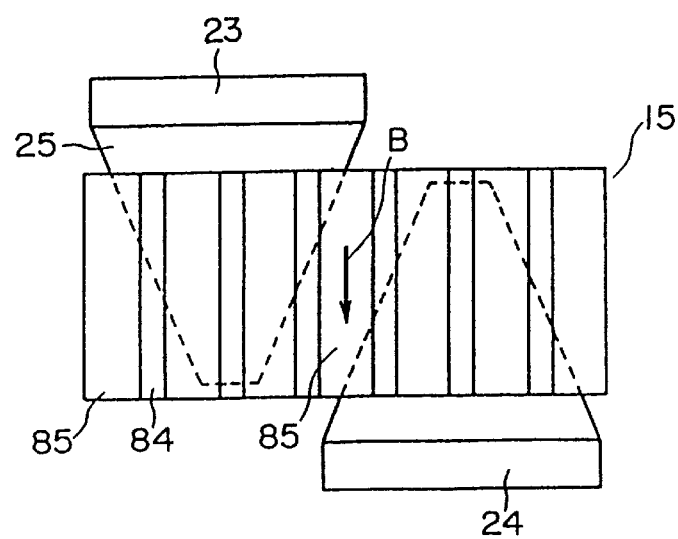
FIG. 15 is a diagram explaining the positional relationship between an inner dial surface of the stator core and an outer radial surface of the rotor in a conventional automotive alternator.

In each of the above Embodiments 1 to 3, a flat surface portion 100 was formed on a root portion of the claw-shaped magnetic poles 51 and 52, but stepped portions 80 extending longitudinally may also be formed on two side portions of claw-shaped magnetic poles 79 of a pole core body 78 as shown in FIG. 8. In this case, when a center line between two adjacent claw-shaped magnetic poles is positioned above a longitudinal center line of an end portion of a tooth, the clearance distance δ between each of the stepped portions 80 of the adjacent claw-shaped magnetic poles and the end portion is greater than the distance between an inner circumferential surface of the end portion and an outer circumferential portion of the claw-shaped magnetic poles. Furthermore, the stator is constructed such that a number of stator coils are electrically connected to each other in parallel in a stator core so as to have a phase difference corresponding to a predetermined electrical angle. In addition, a separate rectifier for converting alternating current into direct current is electrically connected to each of the stator coils. Moreover, there are two slots per pole per phase in the stator core.

Furthermore, the present invention can be applied not only to three-phase alternators but also to alternators with five or seven phases, for example. Moreover, in the above embodiments, when an end portion of a tooth spread in the circumferential direction is positioned between adjacent claw-shaped magnetic poles, there is clearance between the end portion of the tooth and both claw-shaped magnetic poles when viewed from a radial direction, but there need only be clearance between the end portion of the tooth and one of the claw-shaped magnetic poles.

Moreover, the above embodiments were explained with reference to cases in which the phase difference between the first stator coil and the second stator coil was 30 degrees, but the phase difference can be set anywhere within a range of 60 degrees, such as 36 degrees or 42 degrees, for example.

Furthermore, the above embodiments were explained with reference to automotive alternators in which a field coil is secured to a shaft and the field coil is rotated, but the present invention can also be applied to a brushless automotive alternator in which the field coil is secured to a bracket and claw-shaped magnetic poles rotate around the field coil.

As explained above, an automotive alternator according to one aspect of the present invention comprises a rotor having a flat surface portion extending substantially parallel to a shaft secured to the pole core, the flat surface portion being formed in a root portion of claw-shaped magnetic pole such that when an end portion of a tooth spread in a circumferential direction is positioned between adjacent claw-shaped magnetic poles, there is clearance between the end portion of the tooth and at least one of the claw-shaped magnetic poles when viewed from a radial direction. Therefore, the amount of ineffective magnetic flux flowing through the same tooth between adjacent claw-shaped magnetic poles is reduced and effective magnetic flux is increased, thereby increasing output.

According to one form of the automotive alternator, a distance of the clearance between the end portion of the tooth and the claw-shaped magnetic poles may be greater than a distance between an inner circumferential surface of the end portion and an outer circumferential portion of the claw-shaped magnetic poles when a center line between two adjacent claw-shaped magnetic poles is above a longitudinal center line of the end portion. Therefore, magnetic flux generated by the rotor is more reliably routed through the stator, further reducing the amount of ineffective magnetic flux.

An automotive alternator according to another aspect of the present invention comprises a rotor having stepped portions extending longitudinally being formed on two side surfaces of the claw-shaped magnetic pole such that when an end portion of a tooth spread in a circumferential direction is positioned between adjacent claw-shaped magnetic poles, there is clearance between the end portion of the tooth and at least one of the stepped portions of the adjacent claw-shaped magnetic poles when viewed from a radial direction. Therefore, the amount of ineffective magnetic flux flowing through the same tooth between adjacent claw-shaped magnetic poles is reduced and effective magnetic flux is increased, thereby increasing output. Furthermore, by forming stepped portions by cutting away side surfaces of existing claw-shaped magnetic poles, the claw-shaped magnetic poles can be prepared simply.

According to another form of the automotive alternator, a distance of the clearance between the end portion of the tooth and the stepped portions of the claw-shaped magnetic poles may be greater than a distance between an inner circumferential surface of the end portion and an outer circumferential portion of the claw-shaped magnetic poles when a center line between two adjacent claw-shaped magnetic poles is above a longitudinal center line of the end portion. Therefore, magnetic flux generated by the rotor is more reliably routed through the stator, further reducing the amount of ineffective magnetic flux.

According to still another form of the present invention, the stator may comprise a number of stator coils electrically connected to each other in parallel in a stator core so as to have a phase difference corresponding to a predetermined electrical angle. Therefore, surge components which cause disruptions in a waveform can be cancelled, enabling surges in the combined output voltage to be reduced.

According to one form of the present invention, a separate rectifier for converting alternating current into direct current may be electrically connected to each of the stator coils. Therefore, combined output voltage can be obtained which has been converted into direct current without the stator coils being subjected to electrical influence from each other.

According to another form of the present invention, there may be at least two of the slots in the stator core per pole per phase. Therefore, the clearance distance between the claw-shaped magnetic poles and the end portions can be increased, increasing the magnetic resistance between the claw-shaped magnetic poles and the end portions, and the cross-sectional area of magnetic passage through the end portions is also reduced, the amount of ineffective magnetic flux flowing through the same tooth between adjacent claw-shaped magnetic poles is reduced, thereby increasing output further.

What is claimed is:

1. An automotive alternator comprising:
   a stator having a stator core provided with slots formed by a number of teeth spaced circumferentially and extending radially inwards, and a polyphase stator coil installed in said slots; and
   a rotor disposed inside said stator, said rotor having a field coil for generating magnetic flux on passage of electric current, and a pole core covering said field coil and facing said teeth, a number of claw-shaped magnetic poles being formed in said pole core by said magnetic flux,
   a flat surface portion extending substantially parallel to a shaft, said shaft being secured to said pole core, and said flat surface portion being formed in a root portion of a claw-shaped magnetic pole such that when an end portion of one of the stator teeth spread in a circumferential direction is positioned between adjacent claw-shaped magnetic poles, there is clearance between said end portion of said tooth and at least one of said claw-shaped magnetic poles when viewed from a radial direction.

2. The automotive alternator according to claim 1 wherein a distance of said clearance between said end portion of said tooth and said claw-shaped magnetic poles is greater than a distance between an inner circumferential surface of said end portion and an outer circumferential portion of said claw-shaped magnetic poles when a center line between two adjacent claw-shaped magnetic poles is above a longitudinal center line of said end portion.

3. An automotive alternator comprising:

a stator having a stator core provided with slots formed by a number of teeth spaced circumferentially and extending radially inwards, and a polyphase stator coil installed in said slots; and a rotor disposed inside said stator, said rotor having a field coil for generating magnetic flux on passage of electric current, and a pole core covering said field coil and facing said teeth, a number of claw-shaped magnetic poles being formed in said pole core by said magnetic flux, stepped portions extending longitudinally being formed on two side surfaces of a claw-shaped magnetic pole such that when an end portion of one of the stator teeth spread in a circumferential direction is positioned between adjacent claw-shaped magnetic poles, there is clearance between said end portion of said tooth and at least one of said stepped portions of said adjacent claw-shaped magnetic poles when viewed from a radial direction.

4. The automotive alternator according to claim 3 wherein a distance of said clearance between said end portion of said tooth and said stepped portions of said claw-shaped magnetic poles is greater than a distance between an inner circumferential surface of said end portion and an outer circumferential portion of said claw-shaped magnetic poles when a center line between two adjacent claw-shaped magnetic poles is above a longitudinal center line of said end portion.

5. The automotive alternator according to claim 1, wherein said stator comprises a number of stator coils electrically connected to each other in parallel in said stator core so as to have a phase difference corresponding to a predetermined electrical angle.

6. The automotive alternator according to claim 5 wherein a separate rectifier for converting alternating current into direct current is electrically connected to each of said stator coils.

7. The automotive alternator according to claim 1 wherein there are at least two of said slots in said stator core per pole per phase.

8. The automotive alternator according to claim 1 wherein the flat surface portion is formed on a stepped portion on an outer peripheral root portion of said claw-shaped poles.

9. The automotive alternator according to claim 3, wherein said stepped portions are respectively formed on two outer peripheral sides of said claw-shaped pole, wherein each of said stepped portions has a longitudinal flat surface extending substantially an entire length of the claw-shaped pole.

10. The automotive alternator according to claim 8 wherein a distance of said clearance between said end portion of said tooth and said claw-shaped magnetic poles is greater than a distance between an inner circumferential surface of said end portion and an outer circumferential portion of said claw-shaped magnetic poles when a center line between two adjacent claw-shaped magnetic poles is above a longitudinal center line of said end portion.

11. The automotive alternator according to claim 9 wherein a distance of said clearance between said end portion of said tooth and said claw-shaped magnetic poles is greater than a distance between an inner circumferential surface of said end portion and an outer circumferential portion of said claw-shaped magnetic poles when a center line between two adjacent claw-shaped magnetic poles is above a longitudinal center line of said end portion.

* * * * *